(12) United States Patent
Nakadai et al.

(10) Patent No.: US 11,656,650 B2
(45) Date of Patent: May 23, 2023

(54) MODEL GENERATION SYSTEM, MODEL GENERATION METHOD, AND MODEL GENERATION PROGRAM

(71) Applicant: NEC Corporation, Tokyo (JP)

(72) Inventors: Shinji Nakadai, Tokyo (JP); Hao Zhang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 722 days.

(21) Appl. No.: 16/485,475

(22) PCT Filed: Feb. 14, 2017

(86) PCT No.: PCT/JP2017/005248
§ 371 (c)(1),
(2) Date: Aug. 13, 2019

(87) PCT Pub. No.: WO2018/150445
PCT Pub. Date: Aug. 23, 2018

(65) Prior Publication Data
US 2019/0361483 A1    Nov. 28, 2019

(51) Int. Cl.
*G06F 1/00* (2006.01)
*G06F 1/025* (2006.01)
(Continued)

(52) U.S. Cl.
CPC .............. *G06F 1/025* (2013.01); *G06F 17/14* (2013.01); *G06F 30/20* (2020.01); *G06N 20/10* (2019.01); *G06F 2111/10* (2020.01)

(58) Field of Classification Search
CPC .......... G06F 1/025; G06F 20/10; G06F 30/20; G06F 17/14; G06F 2111/10
See application file for complete search history.

(56) References Cited

U.S. PATENT DOCUMENTS

| 8,103,487 B2 * | 1/2012 | Vija | G06T 11/006 703/2 |
| 2003/0016218 A1 * | 1/2003 | Zwicker | G06T 15/04 345/424 |

(Continued)

FOREIGN PATENT DOCUMENTS

| JP | 2010-86466 A | 4/2010 |
| WO | 2016/195496 A2 | 12/2016 |

OTHER PUBLICATIONS

Japanese Office Action for JP Application No. 2019-500053 dated Jun. 1, 2021 with English Translation.

(Continued)

*Primary Examiner* — Khai M Nguyen
(74) *Attorney, Agent, or Firm* — Sughrue Mion, PLLC (57) ABSTRACT

The kernel function generation unit 81 defines a first kernel function by using two-dimensional feature representation that represents a combination of two features of data. The model learning unit 82 defines a linear model including an inner product of a mapping used in the first kernel function and a first weight and performs learning with the defined linear model. The component expanding unit 83 expands the learned linear model to define expanded component representation that is new component representation of the data. The expansion model generation unit 84 generates an expansion model including an inner product of data by the expanded component representation and a second weight.

12 Claims, 4 Drawing Sheets

(51) Int. Cl.
*G06N 20/10* (2019.01)
*G06F 17/14* (2006.01)
*G06F 30/20* (2020.01)
*G06F 111/10* (2020.01)

(56) References Cited

U.S. PATENT DOCUMENTS

2008/0301070 A1* 12/2008 Bartlett .................. G06N 20/00
706/12
2015/0032682 A1* 1/2015 You .......................... G06N 7/01
706/52
2019/0108444 A1* 4/2019 Song ........................ G06N 3/08

OTHER PUBLICATIONS

Hao Zhang et al., "From Black-Box to White-Box: Interpretable Learning with Kernel Machines", MLDM 2018, Machine Learning and Data Mining in Pattern Recognition, Jul. 8, 2018, pp. 213-227.
Lipton, "The Mythos of Model Interpretability", ICML Workshop on Human Interpretability in Machine Learning (WHI 2016), 2016, pp. 96-100 (total 5 pages).
Cao et al., "Approximate RBF Kernel SVM and Its Applications in Pedestrian Classification", The 1st International Workshop on Machine Learning for Vision-based Motion Analysis [online], Oct. 2008, [retrieval date Mar. 16, 2017], Internet:<URL:https://hal.inria.fr/inria-00325810/>, (total 10 pages).
International Search Report for PCT/JP2017/005248 dated Mar. 28, 2017 [PCT/ISA/210].
Written Opinion of the International Searching Authority for PCT/JP2017/005248 dated Mar. 28, 2017 [PCT/ISA/237].

* cited by examiner

MODEL GENERATION SYSTEM, MODEL GENERATION METHOD, AND MODEL GENERATION PROGRAM

This application is a National Stage Entry of PCT/JP2017/005248 filed on Feb. 14, 2017, the contents of all of which are incorporated herein by reference, in their entirety.

TECHNICAL FIELD

The present invention relates to a model generation system, a model generation method, and a model generation program that generate a model based on a kernel method.

BACKGROUND ART

In recent years, learning a prediction model from training data is generally performed, and accuracy (namely, performance) of the prediction model is important. Examples of a high-accuracy model include a kernel machine, a neural network, and the like.

On the other hand, for example, when a prediction model is used in a field of marketing or medical treatment, interpretability of the prediction model is also important. Examples of a high-interpretability model include an additive model.

Note that, NPL 1 describes a property of a high-interpretability model.

CITATION LIST

Non Patent Literature

NPL 1: Zachary C. Lipton, "The Mythos of Model Interpretability", ICML Workshop on Human Interpretability in Machine Learning (WHI 2016), New York, 10 Jun. 2016

SUMMARY OF INVENTION

Technical Problem

In the field of machine learning, the above-described interpretation capability is not clearly defined. For example, in Non Patent Literature 1, as properties of a high-interpretability model, clarity of effect on an (output) label of each (input) feature and capability of diagrammatically representing the learned model are cited.

From the view point of interpretability, types of model will be described by classifying them into two types of models; a "white box model" and a "black box model" described below. The models classified into the "white box model" are, for example, a generalized additive model and a sparse additive model. These models can be represented, for example, by the following Formula 1. Each term shown in Formula 1 is sometimes written as a component. For example, $f_D$ (Feature D) is written as a component D.

$$f(x)=f_1(\text{Feature 1})+f_2(\text{Feature 2})+ \ldots +f_D(\text{Feature D})+ \quad \text{(Formula 1)}$$

In a decision function f(x) having such an additive structure, a degree of partial contribution of each component (more specifically, each feature) to the output and an interaction between features can be interpreted. Such a high-interpretability model has a technical problem that it is simple but generally has a low performance.

The models classified into the "black box model" are, for example, above-described kernel machine and deep neural network. These can obtain good performance with powerful models. However, there is a technical problem that interpretation is generally difficult due to complexity of the model.

Therefore, the present invention aims to provide a model generation system, a model generation method, and a model generation program that can generate a high-interpretability model while keeping performance.

Solution to Problem

The model generation system according to the present invention includes: a kernel function generation unit that defines a first kernel function by using two-dimensional feature representation that represents a combination of two features of data; a model learning unit that defines a linear model including an inner product of a mapping used in the first kernel function and a first weight and performs learning with the defined linear model; a component expanding unit that expands the learned linear model to define expanded component representation that is new component representation of the data; and an expansion model generation unit that generates an expansion model including an inner product of data by the expanded component representation and a second weight.

The model generation method according to the present invention includes: defining a first kernel function by using two-dimensional feature representation that represents a combination of two features of data; defining a linear model including an inner product of a mapping used in the first kernel function and a first weight and performing learning with the defined linear model; expanding the learned linear model to define expanded component representation that is new component representation of the data; and generating an expansion model including an inner product of data by the expanded component representation and a second weight.

The model generation program according to the present invention causes a computer to execute: a kernel function generation process of defining a first kernel function by using two-dimensional feature representation that represents a combination of two features of data; a model learning process of defining a linear model including an inner product of a mapping used in the first kernel function and a first weight and performing learning with the defined linear model; a component expanding process of expanding the learned linear model to define expanded component representation that is new component representation of the data; and an expansion model generation process of generating an expansion model including an inner product of data by the expanded component representation and a second weight.

Advantageous Effects of Invention

According to the present invention, a technical effect of making it possible to generate a high-interpretability model while keeping performance is exerted.

DESCRIPTION OF EMBODIMENTS

As an approach for generating a high-interpretability model while keeping performance, a method of improving performance based on the above-described "white box model" and a method of improving interpretability based on the above-described "black box model" are considered. In the present invention, attention is paid to a kernel machine classified into the "black box model", and a method of improving interpretability will be described.

A kernel function $\kappa: R^D \times R^D \to R$ is represented by the following Formula 2. In Formula 2, "H" represents a high-dimensional Hilbert space and "$\varphi$" represents a feature map of $R^D \to H$.

$$\kappa(x,z) = \langle \varphi(x), \varphi(z) \rangle_H \quad \text{(Formula 2)}$$

The kernel machine is powerful because it can model complicated representation by mapping data to a high-dimensional space. However, the kernel machine is difficult to interpret because it has so-called a black box like characteristic (for example, a support vector machine (SVM) decision function), such as a $\kappa(x, x_i)$ portion of Formula 3 exemplified below.

[Math. 1]

$$f(x) = \text{sign}\left(\sum_{i=1}^{N} \alpha_i y_i \kappa(x, x_i) + b\right) \quad \text{(Formula 3)}$$

In addition, in the kernel machine, in a case where large-scale data is handled, there arise problems of a storage device and a calculation amount due to necessity of calculating a kernel matrix.

The present invention makes it possible to learn a model having high interpretability and high prediction performance without exploding the calculation amount.

An exemplary embodiment of the present invention will be described below with reference to drawings.

Figure 1:
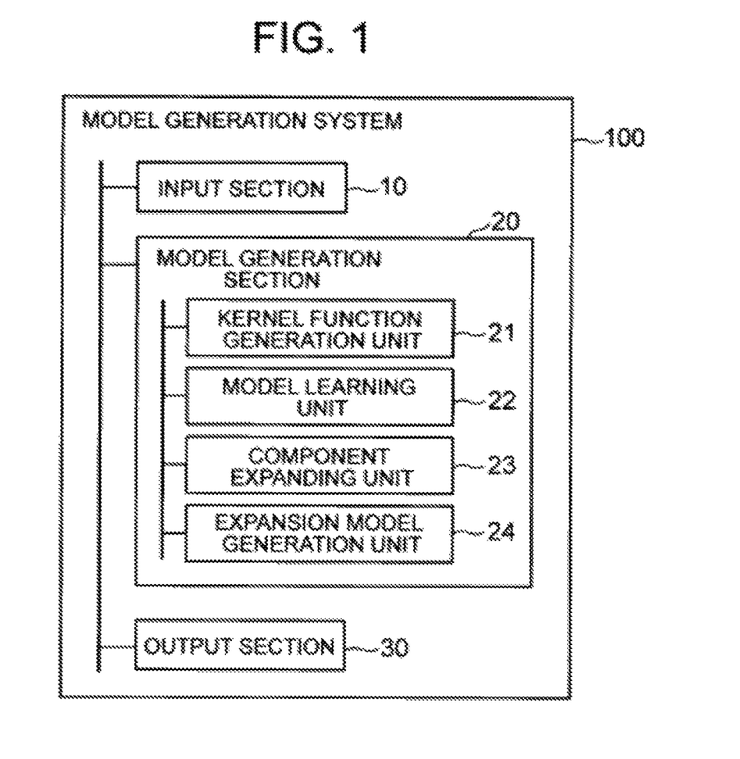
FIG. 1 It depicts a block diagram illustrating one exemplary embodiment of a model generation system according to the present invention.

FIG. 1 depicts a block diagram illustrating one exemplary embodiment of a model generation system according to the present invention. A model generation system 100 of the present exemplary embodiment includes an input section 10, a model generation section 20, and an output section 30.

The input section 10 inputs data that the model generation section 20 described below uses for learning a model. The data to be input may be data stored in a storage unit (not shown) included in the model generation system or may be data received from another device via a communication network.

Figure 2:
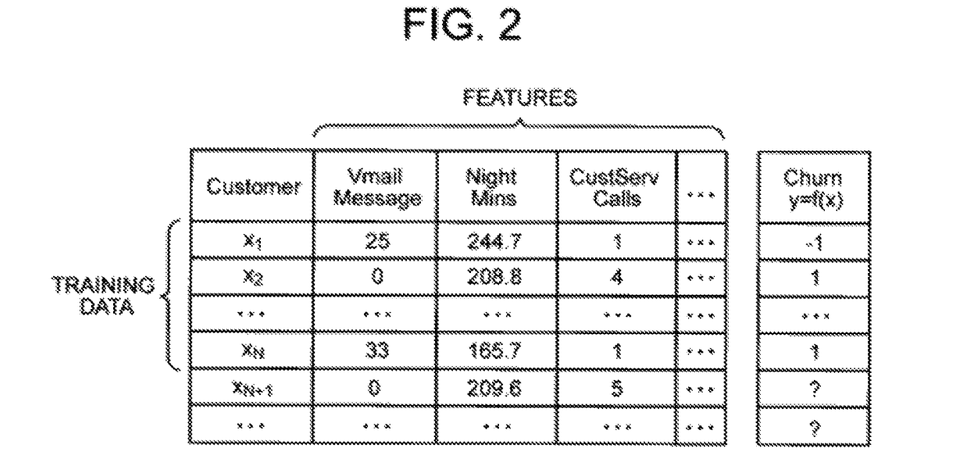
FIG. 2 It depicts an explanatory diagram illustrating an example of data to be input.

FIG. 2 depicts an explanatory diagram illustrating an example of data to be input. The data exemplified in FIG. 2 shows training data used for predicting cancelation. Specifically, the data exemplified in FIG. 2 associates features of N customers (for example, a usage of voice mail, a use time at night, and the number of calls to a customer service center) with whether the customer has canceled (the data is 1 when canceled and −1 when not canceled).

In the following description, training data including one or more features is written as x and a variable to be predicted (objective variable) is written as y.

The model generation section 20 includes a kernel function generation unit 21, a model learning unit 22, a component expanding unit 23, and an expansion model generation unit 24.

The kernel function generation unit 21 generates a kernel function used for definition of a model represented by linear combination. In the following description, a function used in the present exemplary embodiment is written as a scalable white-box (SWB) kernel function in order to distinguish it from a kernel function generally used. Here, a method of generating an SWB kernel function will be described based on a widely known gaussian kernel. However, a kernel function used for generating an SWB kernel function is not limited to a gaussian kernel.

The gaussian kernel function is defined by the following Formula 4.

[Math 2]

$$\kappa_{GAU}(x, z) = \exp\left(-\frac{\|x - z\|_2^2}{2\sigma^2}\right) \quad \text{(Formula 4)}$$

In order to avoid calculating a kernel matrix, the kernel function generation unit 21 approximates the gaussian kernel function shown in the Formula 4 by using random Fourier features (RFF). An approximate formula of the gaussian kernel function is represented by the following Formula 5.

[Math 3]

$$\kappa_{GAU}(x, z) = \langle \phi(x), \phi(z) \rangle_{\mathcal{H}} \approx \hat{\kappa}_{GAU}(x, z) = \langle \hat{\phi}(x), \hat{\phi}(z) \rangle_{\mathbb{R}^d}, \quad \text{(Formula 5)}$$

$$\{\omega_i\}_{i=1}^{d/2} \stackrel{i.i.d.}{\sim} \mathcal{N}(0_D, \sigma^{-2} I_D)$$

Here, a mapping hat($\varphi$)(x) (hat($\varphi$) is $\varphi$ with a superscript ^) is represented by the following Formula 6.

[Math 4]

$$\hat{\phi}(x) := \quad \text{(Formula 6)}$$

$$\sqrt{\frac{2}{d}} \left(\cos(\omega_1^T x), \sin(\omega_1^T x), \ldots, \cos(\omega_{d/2}^T x), \sin(\omega_{d/2}^T x)\right)$$

It is possible to alleviate an expandability issue of a kernel machine by approximating a gaussian kernel function by using RFF.

Next, representation of a combination of two features extracted from x is defined. Specifically, data including a p-th feature and a q-th feature of x is represented as $x^{(p, q)}$. Hereinafter, $x^{(p, q)}$ representing a combination of two features is written as two-dimensional feature representation. In addition, similarly, data including a p-th feature (only one) of x is written as $x^{(p)}$. Then, the Formula 5 can be represented as shown in the following Formula 7.

[Math 5]

$$\hat{k}_{GAU}(x^{(p,q)}, z^{(p,q)}) = \langle \hat{\phi}(x^{(p,q)}), \hat{\phi}(z^{(p,q)}) \rangle_{\mathbb{R}^d},$$ (Formula 7)

$$\{\omega_i\}_{i=1}^{d/2} \overset{i.i.d.}{\sim} \mathcal{N}(0_2, \sigma^{-2}I_2)$$

The kernel function generation unit 21 defines an SWB kernel function shown in the following Formula 8 by using the gaussian kernel function represented by the Formula 7.

[Math 6]

$$\kappa_{SWB}(x, z) := \frac{1}{k}\sum_{p=1}^{D}\sum_{q>p}^{D} \hat{k}_{GAU}(x^{(p,q)}, z^{(p,q)}) = \langle \phi_{SWB}(x), \phi_{SWB}(z) \rangle_{\mathbb{R}^{Kd}}$$ (Formula 8)

Specifically, the kernel function generation unit 21 defines a kernel function by using two-dimensional feature representation that represents a combination of two features of data. In a case of the Formula 8, the kernel function generation unit 21 defines an SWB kernel function with a total sum of the approximated gaussian kernels that are represented by using two-dimensional feature representation. At this time, the number of combinations K of the two-dimensional feature representation is $_DC_2$ in total.

In Formula 8, $\varphi_{SWB}$ is a mapping of $\mathbb{R}^D = \mathbb{R}^{Kd}$, and $\varphi_{SWB}$ is represented by the following Formula 9 from the Formula 6.

[Math 7]

$$\phi_{SWB}(x) = \sqrt{\frac{2}{Kd}}(\cos(\omega_1^T x^{(1,2)}), \sin(\omega_1^T x^{(1,2)}), \ldots, \cos(\omega_{d/2}^T x^{(1,2)}),$$
$$\sin(\omega_{d/2}^T x^{(1,2)}), \ldots, \cos(\omega_1^T x^{(D-1,D)}), \sin(\omega_1^T x^{(D-1,D)}) \ldots,$$
$$\cos(\omega_{d/2}^T x^{(D-1,D)}), \sin(\omega_{d/2}^T x^{(D-1,D)})).$$ (Formula 9)

The model learning unit 22 learns a model used for prediction. First, the model learning unit 22 defines a linear model. Specifically, the model learning unit 22 defines a linear model including an inner product of a mapping $\varphi_{SWB}$ of x and a weight w used in the SWB kernel function as shown in the following Formula 10.

[Math 8]

$$\tilde{f}(x) := \langle w, \phi_{SWB}(x) \rangle \mathbb{R}^{Kd} + \tilde{b}$$ (Formula 10)

In Formula 10, a weight w is defined by the following Formula 11.

[Math 9]

$$w=(w_{\cos,1}^{(1,2)}, w_{\sin,1}^{(1,2)}, \ldots, w_{\sin,d/2}^{(1,2)}, \ldots, w_{\cos,1}^{(D-1,D)}, w_{\sin,1}^{(D-1,D)}, \ldots, w_{\sin,d/2}^{(D-1,D)})$$ (Formula 11)

The model learning unit 22 learns a model based on input data by using the defined linear model. Specifically, the model learning unit 22 learns w and a tilde(b) (tilde(b) is b with superscript ~) included in the Formula 10 by solving a linear problem that is defined by the following Formula 12.

[Math 10]

$$\min_{w,\tilde{b}} \frac{1}{N}\sum_{i=1}^{N} \ell(\tilde{f}(x_i), y_i) + \frac{\tilde{\lambda}}{2}\|w\|_2^2$$ (Formula 12)

In Formula 12, for example, Formula 13 and Formula 14 shown below correspond to an SVM classification and a ridge regression, respectively.

[Math 11]

$$l(\tilde{f}(x),y)=\max(0,1-y\tilde{f}(x)), y \in \{-1,1\}$$ (Formula 13)

$$l(\tilde{f}(x),y)=\frac{1}{2}(y-\tilde{f}(x))^2, y \in \mathbb{R}$$ (Formula 14)

The component expanding unit 23 expands the defined linear model to define new component representation of each data x. In the following description, the new component representation is sometimes written as expanded component representation.

In the present exemplary embodiment, Taylor expansion is used for expansion of a linear model (more specifically, inner product portion included in the linear model). When Taylor expansion is used, the following Formula 15 is obtained for a cosine function.

[Math 12]

$$\cos(\omega_i^T x) = \sum_{n=0}^{\infty} \frac{(-1)^n}{(2n)!}(\omega_i^T x)^{2n}$$ (Formula 15)

The right side $(w_i^T x)^{2n}$ of Formula 15 can be expanded by polynomial theorem as shown in the following Formula 16.

[Math 13]

$$(\omega_i^T x)^{2n} = \sum_{p=1}^{D}(\omega_i^{(p)} x^{(p)})^{2n} + \sum_{\substack{\sum_{i=1}^{D} r_i = 2n \\ r_i \neq 2n}} \binom{2n}{r_1, \ldots, r_D} \prod_{1 \leq p \leq D}(\omega_i^{(p)} x^{(p)})^{r_p}$$ (Formula 16)

Formula 17 shown below can be obtained from the Formula 15 and Formula 16.

[Math 14]

$$\cos(\omega_i^T x) = \sum_{p=1}^{D} c_i^{(p)}(x) + c_i^{(1,\ldots,D)}(x)$$ (Formula 17)

In Formula 17, $c_i^{(p)}$ and $c_i^{(1,\ldots,D)}$ are represented by the following Formula 18 and Formula 19.

[Math 15]

$$c_i^{(p)}(x) := \cos(\omega_i^{(p)} x^{(p)})$$ (Formula 18)

$$c_i^{(1,\ldots,D)}(x) := \cos(\omega_i^T x) - \sum_{p=1}^{D} c_i^{(p)}(x)$$ (Formula 19)

From the Formula 15, similarly to Formula 19, Formula 20 shown below can be obtained also for a sine function.

[Math 16]

$$\sin(\omega_i^T x) = \sum_{p=1}^{D} s_i^{(p)}(x) + s_i^{(1,\ldots,D)}(x)$$ (Formula 20)

By expansion of trigonometric functions shown in the Formula 17 and Formula 20, the component expanding unit 23 can extract $\langle w, \varphi_{SWB}(x) \rangle_{RKd}$ included in a model represented by the Formula 10 into some terms as shown in the following Formula 21.

[Math 17]

$$\langle w, \phi_{SWB}(x) \rangle_{\mathbb{R}Kd} = \sqrt{\frac{2}{Kd}} \sum_{p=1}^{D} \sum_{q>p}^{D} \sum_{i=1}^{d/2} w_{cos,i}^{(p,q)} \cos(\omega_i^T x^{(p,q)}) + w_{sin,i}^{(p,q)} \sin(\omega_i^T x^{(p,q)}) =$$
$$\sqrt{\frac{2}{Kd}} \sum_{p=1}^{D} \sum_{q>p}^{D} \sum_{i=1}^{d/2} w_{cos,i}^{(p,q)} \left( c_i^{(p)}(x^{(p,q)}) + c_i^{(q)}(x^{(p,q)}) + c_i^{(p,q)}(x^{(p,q)}) \right) +$$
$$w_{sin,i}^{(p,q)} \left( s_i^{(p)}(x^{(p,q)}) + s_i^{(q)}(x^{(p,q)}) + s_i^{(p,q)}(x^{(p,q)}) \right)$$

(Formula 21)

The component expanding unit 23 defines new component representation tilde(x) (tilde(x) is x with superscript ~) of each data as shown in the following Formula 22 by making each of the same feature or the same pair of features correspond to the same term. That is, by making each of the same feature or the same pair correspond to the same term, it is possible to obtain new component representation (expanded component) of each data.

[Math 18]

$$\tilde{x} := (\tilde{\chi}^{(1)}, \ldots, \tilde{\chi}^{(d)}, \tilde{\chi}^{(1,2)}, \ldots, \tilde{\chi}^{(D-1,D)})$$

(Formula 22)

In Formula 22, tilde(x)$^{(p)}$ is a component calculated based on a sum of all terms related to a single p-th feature. In addition, tilde(x)$^{(p, q)}$ corresponds to an interaction effect between a p-th feature and a q-th feature. The number of components of tilde(x) is $D+(D\times(D-1))/2$.

Thus, the component expanding unit 23 defines an expanded component including a component that is calculated based on a sum of all related terms for each single feature and a component indicating all interaction effects between two features by expanding the defined linear model based on RFF and expansion of trigonometric functions.

The expanded component thus defined can represent one feature and the interaction effect between two features.

The expansion model generation unit 24 generates a model by using the defined expanded component and learns the generated model. Specifically, the expansion model generation unit 24 defines a decision function with the defined expanded component as an explanatory variable as shown in the following Formula 23.

[Math 19]

$$f(\tilde{x}) := \beta^T \tilde{x} + b$$

(Formula 23)

In Formula 23, $\beta$ is defined by the following Formula 24.

[Math 20]

$$\beta = (\beta^{(1)}, \ldots, \beta^{(D)}, \beta^{(1,2)}, \ldots, \beta^{(D-1,D)})$$

(Formula 24)

The expansion model generation unit 24 acquires a sparse result by solving a problem of Formula 25 shown below. Specifically, the expansion model generation unit 24 sets the weight (coefficient) of an unimportant component to zero (that is, obtains a sparse result) by solving the Formula 25 shown below by L1 regularization.

[Math 21]

$$\min_{\beta, b} \frac{1}{N} \sum_{i=1}^{N} \ell(f(\tilde{x}_i), y_i) + \lambda \|\beta\|_1$$

(Formula 25)

In addition, the expansion model generation unit 24 defines a function indicating a partial contribution degree of each component as shown in Formula 26 and Formula 27 shown below so that the contribution of each component can be interpreted.

[Math 22]

$$f^{(p)}(\tilde{x}) := \beta^{(p)} \tilde{\chi}^{(p)}$$

(Formula 26)

$$f^{(p,q)}(\tilde{x}) := \beta^{(p,q)} \tilde{\chi}^{(p,q)}$$

(Formula 27)

By the definition of the Formula 26 and Formula 27, the partial contribution degree of each component can be visualized. From this, the generated model can be said to be a high-interpretability model as a result.

The output section 30 outputs a processing result by the model generation section 20. The output section 30, for example, may visualize and display the generated model or may display the partial contribution degree of each component based on the Formula 26 or Formula 27.

Figure 3:
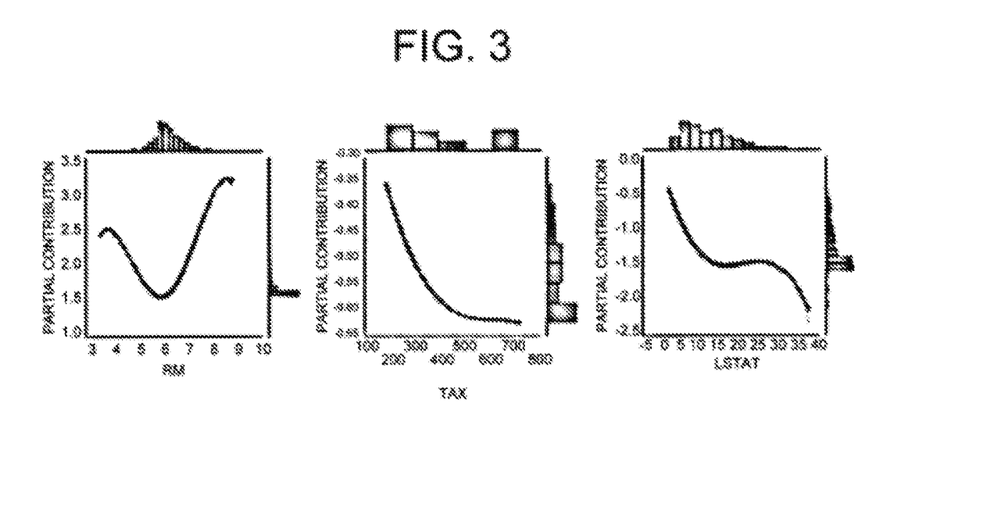
FIG. 3 It depicts an explanatory diagram illustrating an example in which a contribution degree of a component representing a single feature is visualized.

FIG. 3 depicts an explanatory diagram illustrating an example in which a contribution degree of a component representing a single feature is visualized. In an example shown in FIG. 3, the lateral axis direction represents a numerical value of a component representing a single feature and the vertical axis direction represents a partial contribution degree. For example, a graph written in the center of FIG. 3 shows a tax (specifically, an amount of tax per ten thousand dollars) in the lateral axis direction and a contribution degree to sales in the vertical axis direction. With reference to FIG. 3, it can be confirmed that as an amount of tax increases, a contribution degree to sales decreases.

Figure 4:
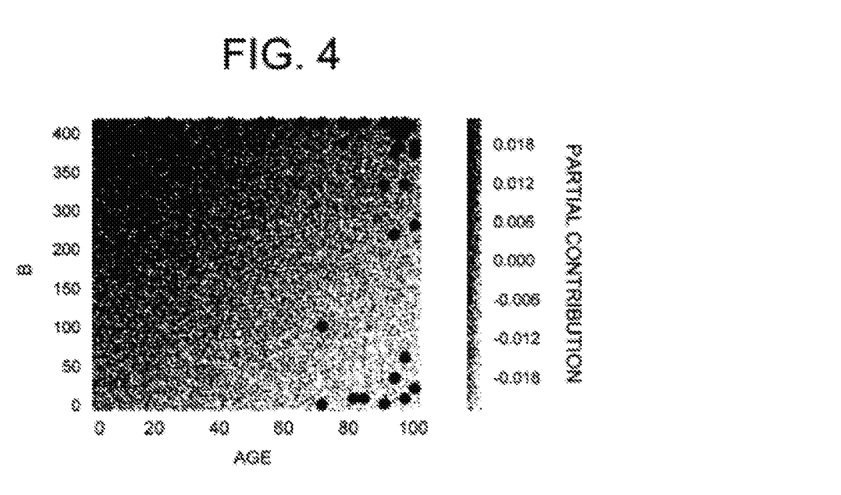
FIG. 4 It depicts an explanatory diagram illustrating an example in which a contribution degree of a component representing an interaction effect is visualized.

In addition, FIG. 4 depicts an explanatory diagram illustrating an example in which a contribution degree of a component representing an interaction effect is visualized. The example shown in FIG. 4 represents that in the vertical and lateral directions, the pair of features representing interaction effects are shown respectively and partial contribution degrees are shown by color variations. For example, the graph written in FIG. 4 shows a ratio (specifically, a ratio of owner occupying units constructed before 1940) in the lateral axis direction, and shows a value calculated from a ratio of black men (specifically, a value calculated by 1000 (Bk−0.63)^2 where Bk is a ratio of black men) in the vertical axis direction. The shading in the graph shows a contribution degree to the sales.

The input section 10, the model generation section 20 (more specifically, the kernel function generation unit 21, the model learning unit 22, the component expanding unit 23, and the expansion model generation unit 24), and the output section 30 are realized by a CPU operating according to a program (model generation program).

For example, a program is stored in the storage unit (not shown) included in the model generation system 100, and the CPU reads the program and may operate as the input section 10, the model generation section 20 (more specifically, the kernel function generation unit 21, the model learning unit 22, the component expanding unit 23, and the expansion model generation unit 24), and the output section 30 according to the program.

The input section 10, the model generation section 20 (more specifically, the kernel function generation unit 21, the model learning unit 22, the component expanding unit 23, and the expansion model generation unit 24), and the output section 30 may be realized by dedicated hardware, respectively.

Figure 5:
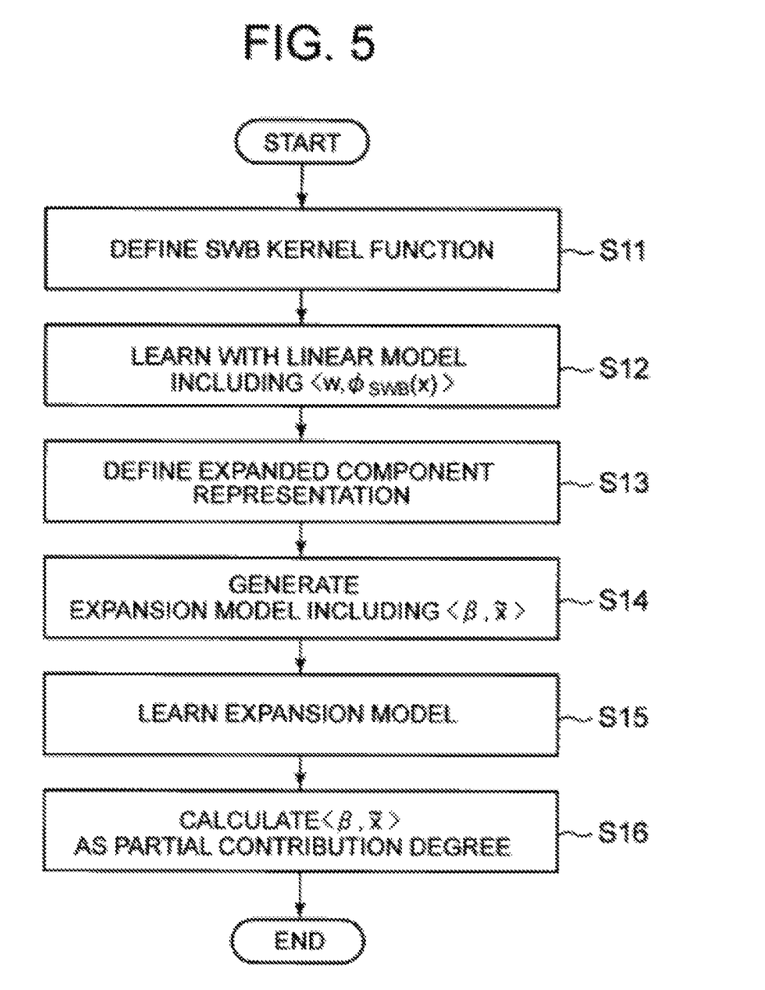
FIG. 5 It depicts a flowchart illustrating an operation example of the model generation system.

Next, the operation of the model generation system of the present exemplary embodiment will be described. FIG. 5 depicts a flowchart illustrating an operation example of the model generation system of the present exemplary embodiment.

First, the kernel function generation unit 21 defines an SWB kernel function as shown in the Formula 8 by using two-dimensional feature representation (step S11). Specifically, the kernel function generation unit 21 approximates a kernel function with RFF and defines an SWB function that represents an argument of the approximated kernel function with two-dimensional feature representation.

Next, the model learning unit 22 defines a linear model including an inner product of a mapping φ and a weight w used in the SWB kernel function as shown in the Formula 10 and performs learning with the defined linear model (step S12).

The component expanding unit 23 expands the learned linear model to define expanded component representation (step S13). Specifically, the component expanding unit 23 defines an expanded component including a component that is calculated based on a sum of all related terms for each single feature of data and a component indicating all interaction effects between two features as shown in the Formula 22.

When defining such an expanded component, the component expanding unit 23 performs Taylor expansion of the defined linear model based on RFF and expansion of the trigonometric functions. Then, the component expanding unit 23 defines expanded component representation by making each of the same feature or the same combination of features correspond to the same term in the expanded linear model.

The expansion model generation unit 24 generates an expansion model including an inner product of data tilde(x) by the expanded component representation and a weight β as shown in the Formula 23 (step S14). Then, the expansion model generation unit 24 learns the expansion model by using L1 regularization (step S15). In addition, the expansion model generation unit 24 calculates an inner product <β, tilde(x)> (that is, a product of a weight and a component) as a partial contribution degree (step S16).

As described above, in the present exemplary embodiment, the kernel function generation unit 21 defines the SWB kernel function by using two-dimensional feature representation, and the model learning unit 22 defines the linear model including the inner product of a mapping φ and a weight w used in the SWB kernel function and performs learning. Then, the component expanding unit 23 expands the learned linear model to define the expanded component representation (tilde(w)), and the expansion model generation unit 24 generates the expansion model including the inner product of a tilde(w) and a weight β.

With such a configuration, it is possible to generate a high-interpretability model while keeping performance. That is, in the present exemplary embodiment, it is possible to improve interpretability while keeping performance by generating two-dimensional feature representation as the expanded component, based on a high-performance kernel method.

Note that, while in the present exemplary embodiment, the gaussian kernel is exemplified as a kernel, for example, other shift-variant kernels, such as a Laplacian kernel and a Matern kernel, may be used.

In addition, the model generation method of the present exemplary embodiment is usable as a general method of generating a model because it is designed not only for a classification task but also for a regression task. For the above reason, the model generation method of the present exemplary embodiment can be used also for a learning task without teacher's presence.

Figure 6:
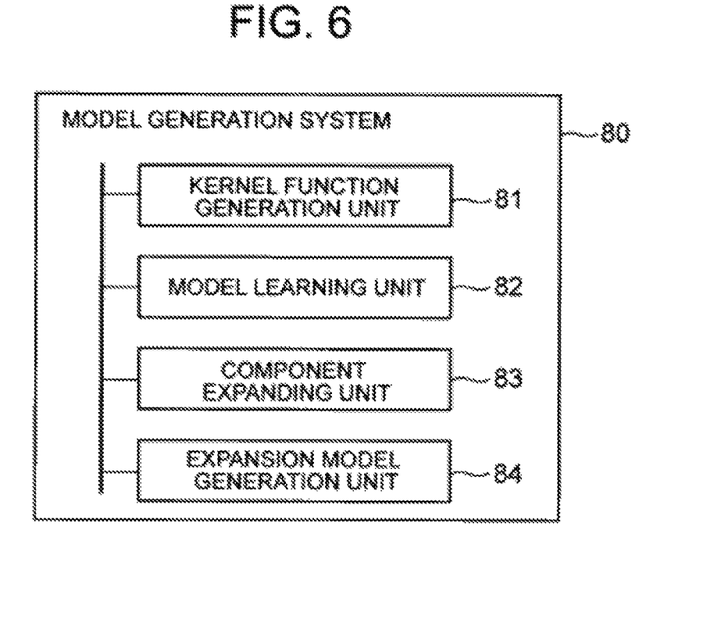
FIG. 6 It depicts a block diagram illustrating a summary of the model generation system according to the present invention.

Next, summary of the present invention will be described. FIG. 6 depicts a block diagram illustrating the summary of the model generation system according to the present invention. A model generation system 80 according to the present invention includes a kernel function generation unit 81 (for example, the kernel function generation unit 21) that defines a first kernel function (for example, the SWB kernel function) by using two-dimensional feature representation (for example, $x^{(p,\,q)}$) that represents a combination of two features of data (for example, x), a model learning unit 82 (for example, the model learning unit 22) that defines a linear model (for example, the model represented by the Formula 10) including an inner product (for example, $<w, \varphi_{SWB}(x)>$) of a mapping (for example, $\varphi_{SWB}$) used in the first kernel function and a first weight (for example, w) and performs learning with the defined linear model, a component expanding unit 83 (for example, the component expanding unit 23) that expands the learned linear model to define expanded component representation (for example, tilde(x) shown in the Formula 22) that is new component representation of data, and an expansion model generation unit 84 (for example, the expansion model generation unit 24) that generates an expansion model (for example, the model shown in the Formula 23) including an inner product (for example, <β, tilde(x)>) of data by the expanded component representation and a second weight (for example, β).

With such a configuration, it is possible to generate a high-interpretability model while keeping performance. A model that has achieved both prediction performance and interpretation capability can be applied for solving various problems in the real world. For example, for predictive analysis in the real society, such as medical treatment concerned with human life, social infrastructure supporting a life line, and social security by the government, high prediction performance is required as a matter of course, and it is also required in many cases to be able to explain the basis of the prediction clearly to a user. A prediction model that is high in prediction accuracy but is like a black box in its behavior can be applied for solving partial problems in the real world, but there are many problems for which such a prediction model cannot be applied. On the other hand, linear regression, decision tree, and the like are simple and easy to understand, but cannot grasp behaviors of complexed big data, and thus a prediction accuracy is low. According to the present invention, it is possible to learn a prediction model that has achieved both prediction performance and interpretation capability. Such a prediction model can be applied for solving various problems in the real world compared with the general prediction model. As described above, the present invention is not an invention related to simple improvement of mathematical processing but an invention for improving performance of a computer itself that learns a prediction model that solves the problems in the real world.

The kernel function generation unit may approximate a second kernel function (for example, a gaussian kernel function) with a random Fourier feature (RFF) and define a first kernel function that represents an argument of the approximated second kernel function with two-dimensional feature representation.

Since such a configuration enables to improve expandability in addition to the above effect as a result, the performance of a computer can be improved dramatically. Thus, the present invention improves functions of a computer itself that performs mechanical learning processing so that a model having high interpretability and high prediction performance can be learned. In addition, the present invention improves functions of a computer itself that performs mechanical learning processing so that a calculation amount does not explode when a model having high interpretability and high prediction performance is learned.

Specifically, the component expanding unit 83 may define an expanded component including a component that is calculated based on a sum of all related terms for each single feature of data and a component indicating all interaction effects between two features.

The expansion model generation unit 84 may learn an expansion model by using L1 regularization. Since the expansion model thus learned can set the weight of unimportant component to zero (that is, can obtain a sparse result), it is possible to specify a more important component.

In addition, the expansion model generation unit 84 may calculate a product of a weight and a component (for example, the Formula 26 and Formula 27) as a partial contribution degree. It is possible to grasp tendency of a feature included in each component and a contribution degree by calculating such a partial contribution degree.

Further, the component expanding unit 83 may define expanded component representation by making each of the same feature or the same combination of features correspond to the same term in the expanded linear model.

The component expanding unit 83 may define an expanded component by expanding the defined linear model based on random Fourier feature and expansion of trigonometric functions.

The component expanding unit may expand the linear model by Taylor expansion.

Figure 7:
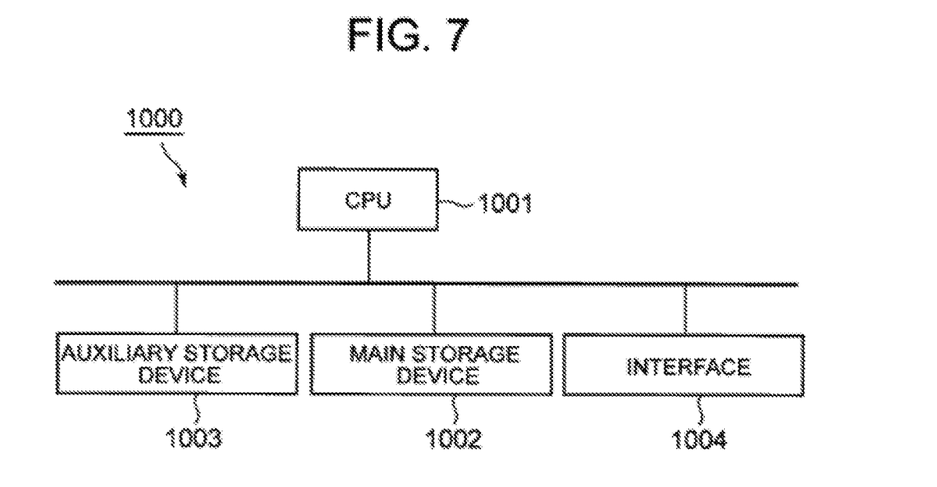
FIG. 7 It depicts a schematic block diagram illustrating a configuration of a computer related to at least one exemplary embodiment.

FIG. 7 depicts a schematic block diagram illustrating a configuration of a computer related to at least one exemplary embodiment. A computer 1000 includes a CPU 1001, a main storage device 1002, an auxiliary storage device 1003, and an interface 1004.

The above-mentioned model generation systems are implemented on the computers 1000, respectively. The operation of the above-mentioned each processing unit is stored in the auxiliary storage device 1003 in a form of a program (model generation program). The CPU 1001 reads the program from the auxiliary storage device 1003 and expands it into the main storage device 1002, and executes the processing according to the program.

Note that, in at least one exemplary embodiment, the auxiliary storage device 1003 is one example of non-transitory tangible medium. Other examples of non-transitory tangible medium include a magnetic disk, a magneto-optical disk, CD-ROM, DVD-ROM, a semiconductor memory, or the like that is connected via the interface 1004. When the program is distributed to the computer 1000 through a communication line, the computer 1000 having received the distribution may expand the program into the main storage device 1002 and execute the processing.

In addition, the program may realize a part of the above-mentioned functions. Furthermore, the program may be a so-called differential file (differential program) that realizes the above-mentioned function by a combination with another program already stored in the auxiliary storage device 1003.

A part or whole of the above-described exemplary embodiment can be also described as in the following supplementary notes, but are not limited to the following.

Supplementary Note 1

A model generation system, including: a kernel function generation unit that defines a first kernel function by using two-dimensional feature representation that represents a combination of two features of data; a model learning unit that defines a linear model including an inner product of a mapping used in the first kernel function and a first weight and performs learning with the defined linear model; a component expanding unit that expands the learned linear model to define expanded component representation that is new component representation of the data; and an expansion model generation unit that generates an expansion model including an inner product of data by the expanded component representation and a second weight.

Supplementary Note 2

The model generation system according to supplementary note 1, wherein the kernel function generation unit approximates a second kernel function with a random Fourier feature and defines a first kernel function that represents an argument of the approximated second kernel function with two-dimensional feature representation.

Supplementary Note 3

The model generation system according to supplementary note 1 or 2, wherein the component expanding unit defines an expanded component including a component that is calculated based on a sum of all related terms for each single feature of data and a component indicating all interaction effects between two features.

Supplementary Note 4

The model generation system according to any one of supplementary notes 1 to 3, wherein the expansion model generation unit learns an expansion model by using L1 regularization.

Supplementary Note 5

The model generation system according to any one of supplementary notes 1 to 4, wherein the expansion model generation unit calculates a product of a weight and a component as a partial contribution degree.

Supplementary Note 6

The model generation system according to any one of supplementary notes 1 to 5, wherein the component expanding unit defines expanded component representation by making each of the same feature or the same combination of features correspond to the same term in the expanded linear model.

Supplementary Note 7

The model generation system according to any one of supplementary notes 1 to 6, wherein the component expanding unit defines an expanded component by expanding the defined linear model based on random Fourier feature and expansion of a trigonometric function.

Supplementary Note 8

The model generation system according to any one of supplementary notes 1 to 7, wherein the component expanding unit expands a linear model by Taylor expansion.

Supplementary Note 9

A model generation method, including: defining a first kernel function by using two-dimensional feature representation that represents a combination of two features of data; defining a linear model including an inner product of a mapping used in the first kernel function and a first weight and performing learning with the defined linear model; expanding the learned linear model to define expanded component representation that is new component representation of the data; and generating an expansion model including an inner product of data by the expanded component representation and a second weight.

Supplementary Note 10

The model generation method according to supplementary note 9, comprising approximating a second kernel function with a random Fourier feature and defining a first kernel function that represents an argument of the approximated second kernel function with two-dimensional feature representation.

Supplementary Note 11

A model generation program, causing a computer to execute: a kernel function generation process of defining a first kernel function by using two-dimensional feature representation that represents a combination of two features of data; a model learning process of defining a linear model including an inner product of a mapping used in the first kernel function and a first weight and performing learning with the defined linear model; a component expanding process of expanding the learned linear model to define expanded component representation that is new component representation of the data; and an expansion model generation process of generating an expansion model including an inner product of data by the expanded component representation and a second weight.

Supplementary Note 12

The model generation program according to supplementary note 11, causing a computer to approximate, in the kernel function generation process, a second kernel function with a random Fourier feature and define a first kernel function that represents an argument of the approximated second kernel function with two-dimensional feature representation.

REFERENCE SIGNS LIST

10 Input section
20 Model generation section
21 Kernel function generation unit
22 Model learning unit
23 Component expanding unit
24 Expansion model generation unit
30 Output section
100 Model generation system

What is claimed is:

1. A model generation system, comprising:
at least one processor; and
at least one memory storing instructions that, when executed by the at least one processor, cause the processor to perform a method, the method comprising:
defining a first kernel function by using two-dimensional feature representation that represents a combination of two features of data;
defining a linear model including an inner product of a mapping used in the first kernel function and a first weight and performing learning with the defined linear model;
expanding the learned linear model to define expanded component representation that is new component representation of the data; and
generating an expansion model including an inner product of data by the expanded component representation and a second weight.

2. The model generation system according to claim 1, wherein the first kernel function approximates a second kernel function with a random Fourier feature and represents an argument of the approximated second kernel function with two-dimensional feature representation.

3. The model generation system according to claim 1, wherein the expanding the learned linear model defines an expanded component including a component that is calculated based on a sum of all related terms for each single feature of data and a component indicating all interaction effects between two features.

4. The model generation system according to claim 1, wherein the generating the expansion model learns an expansion model by using L1 regularization.

5. The model generation system according to claim 1, wherein the generating the expansion model calculates a product of a weight and a component as a partial contribution degree.

6. The model generation system according to claim 1, wherein the expanding the learned linear model defines expanded component representation by making each of the same feature or the same combination of features correspond to the same term in the expanded linear model.

7. The model generation system according to claim 1, wherein the expanding the learned linear model defines an expanded component by expanding the defined linear model based on random Fourier feature and expansion of a trigonometric function.

8. The model generation system according to claim 1, wherein the expanding the learned linear model expands a linear model by Taylor expansion.

9. A model generation method, implemented by at least one processor executing program instructions stored in at least one memory, the method comprising:
defining a first kernel function by using two-dimensional feature representation that represents a combination of two features of data;
defining a linear model including an inner product of a mapping used in the first kernel function and a first weight and performing learning with the defined linear model;

expanding the learned linear model to define expanded component representation that is new component representation of the data; and generating an expansion model including an inner product of data by the expanded component representation and a second weight.

10. The model generation method according to claim 9, comprising approximating a second kernel function with a random Fourier feature and defining a first kernel function that represents an argument of the approximated second kernel function with two-dimensional feature representation.

11. A non-transitory computer readable information recording medium storing a model generation program, when executed by a processor, that performs a method for:

defining a first kernel function by using two-dimensional feature representation that represents a combination of two features of data;

defining a linear model including an inner product of a mapping used in the first kernel function and a first weight and performing learning with the defined linear model;

expanding the learned linear model to define expanded component representation that is new component representation of the data; and generating an expansion model including an inner product of data by the expanded component representation and a second weight.

12. The non-transitory computer readable information recording medium according to claim 11, comprising approximating a second kernel function with a random Fourier feature and defining a first kernel function that represents an argument of the approximated second kernel function with two-dimensional feature representation.

* * * * *